United States Patent
Isley (10) Patent No.: US 7,225,842 B2
(45) Date of Patent: *Jun. 5, 2007

(54) FEED ROLLERS FOR TREE HANDLING

(75) Inventor: Reggald Emory Isley, Grande Prairie (CA)

(73) Assignee: Risley Enterprises Ltd., Grande Prairie (CA)

( * ) Notice: Subject to any disclaimer, the term of this patent is extended or adjusted under 35 U.S.C. 154(b) by 193 days.

This patent is subject to a terminal disclaimer.

(21) Appl. No.: 10/766,081

(22) Filed: Jan. 29, 2004

(65) Prior Publication Data

US 2004/0211489 A1    Oct. 28, 2004

Related U.S. Application Data (63) Continuation-in-part of application No. 10/345,212, filed on Jan. 16, 2003, now Pat. No. 6,684,923.

(51) Int. Cl.
*B27B 31/00* (2006.01)

(52) U.S. Cl. ............... 144/248.7; 144/24.13; 144/248.3; 144/248.7; 198/780; 492/30; 492/32

(58) Field of Classification Search ............ 144/242.1, 144/246.1, 248.3, 248.7, 24.13, 248.5, 343; 198/618, 624, 780; 492/30, 32, 33, 36
See application file for complete search history.

(56) References Cited

U.S. PATENT DOCUMENTS

| 2,588,121 | A | * | 3/1952 | Johnston ...................... 198/780 |
| 3,821,076 | A | * | 6/1974 | Stenberg et al. ............ 162/301 |
| 4,047,274 | A | * | 9/1977 | Lehmann ..................... 492/33 |
| 4,901,778 | A |   | 2/1990 | Fenton |
| 4,930,179 | A | * | 6/1990 | Wright et al. ............. 15/230.11 |
| 4,972,890 | A | * | 11/1990 | Isley ........................ 144/246.1 |
| 5,806,130 | A | * | 9/1998 | Pascoe .................... 15/230.11 |
| 6,394,259 | B1 |   | 5/2002 | Alhainen |
| 6,764,456 | B1 | * | 7/2004 | Doherty ...................... 601/121 |

FOREIGN PATENT DOCUMENTS

WO     WO 99/16598 A1     4/1999

OTHER PUBLICATIONS

Search Report for European Patent Application No. 05075214.6-1260-European Patent Office, Jun. 1, 2005.

* cited by examiner

*Primary Examiner*—Bena Miller
(74) *Attorney, Agent, or Firm*—Oyen Wiggs Green & Mutala LLP (57) ABSTRACT

A feed roll for tree handling has a number of strips which substantially cover its outer face. The strips have leading and trailing edges shaped to interdigitate with one another. A layer of resilient or slippery material is located between the strips and a drum. The strips can rock slightly.

28 Claims, 9 Drawing Sheets

FEED ROLLERS FOR TREE HANDLING

REFERENCE TO RELATED APPLICATION

This is a continuation-in-part of application Ser. No. 10/345,212 filed on 16 Jan. 2003 now U.S. Pat. No. 6,684,923 and entitled Feed Rolls for Tree Handling Equipment.

TECHNICAL FIELD

This invention relates to rolls for feeding logs through tree handling equipment such as delimbers, tree processors and the like.

BACKGROUND

Some tree delimbers include a pair of curved knives that can be brought into contact with the outer surface of a log. The log is pulled past the knives which shear off any limbs projecting from the log. In typical tree delimbers the log is moved by compressing it between a pair of counter-rotating feed rollers. The feed rollers grip the log and move it along. Examples of tree delimbers which work in this general manner are the SIDEWINDER™ and LIM-MIT™ delimbers made by Risley Manufacturing Ltd. of Grande Prairie, Alberta, Canada.

Some existing feed rollers are faced with spikes to enable them to better grip the outer surface of a log. These spikes can incise the outer layer of wood of the log, which is undesirable.

Other commonly-used feed rollers comprise a rubber-coated cylinder having a chain mesh stretched over its outer surface. These feed rollers, while reducing damage to the log surface, suffer from relatively short service lives and can be undesirably expensive.

Commonly-owned U.S. Pat. No. 4,972,890 describes a type of feed roller which comprises a cylindrical drum having contour-edged bars bolted to its outer surface. The contour-edged bars are relatively widely spaced apart. These feed rollers have not been completely successful, because they can cause chipping of the outer surface of logs.

Despite the variety of feed rollers available for use in tree processing machinery there remains a need for feed rollers which improve on the performance and/or cost effectiveness of current feed rollers.

SUMMARY OF THE INVENTION

One aspect of the invention provides a feed roller for handling trees. The feed roller comprises a rotatable support member and a plurality of elongated strips coupled to the support member. The strips extend substantially parallel to one another in a cylindrical configuration. Each of the strips has a leading edge having a plurality of spaced apart projections. The leading edge projections interdigitate with projections on a trailing edge of an adjacent one of the strips.

Another aspect of the invention provides a feed roller for tree handling. The feed roller comprises a drum having a longitudinal axis and a substantially cylindrical surface. A plurality of strips are spaced apart around a circumference of the drum. The strips extend substantially parallel to the longitudinal axis. Each strip has a leading edge and a trailing edge. Each strip has projections on its leading and trailing edges. The projections on the leading edge of each strip interdigitate with projections on a trailing edge of an adjacent strip. Each strip has a first end extending into a first pocket at a first end of the surface and a second end extending into a second pocket at a second end of the surface.

Yet another aspect of the invention provides a feed roller for tree handling. The feed roller comprises a substantially cylindrical drum having a longitudinal axis and a plurality of metal strips spaced apart around a circumference of the drum. The strips extend substantially parallel to the longitudinal axis. Each metal strip has a leading edge and a trailing edge. The leading edge is shaped to provide projections. The trailing edge has a shape complimentary to the shape of the leading edge of an adjacent one of the strips. The projections on the leading edge of each metal strip interdigitate with projections on a trailing edge of an adjacent one of the metal strips. The strips are coupled to the drum by a coupling. The coupling permits the strips to rock from side to side.

A further aspect of the invention provides a replacement tree gripping member for a feed roll for tree handling. The tree gripping member comprises a strip of metal having a textured outer face. An inner face of the strip bears a band of a material. The material of the band is resilient, has a static coefficient of friction with steel not exceeding 1, or is both resilient and has a static coefficient of friction with steel not exceeding 1. The strip has a wavy leading edge comprising a plurality of projections, and a wavy trailing edge comprising a plurality of projections complementary to the leading edge projections. The band of material is narrower than the strip.

Further features and aspects of the invention are described below.

BRIEF DESCRIPTION OF DRAWINGS

In Figures which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention relates to feed rollers for feeding logs. Such feed rollers may be used in various applications. Feed rollers may be used, for example, in roll-stroke delimbers.

Figure 1:
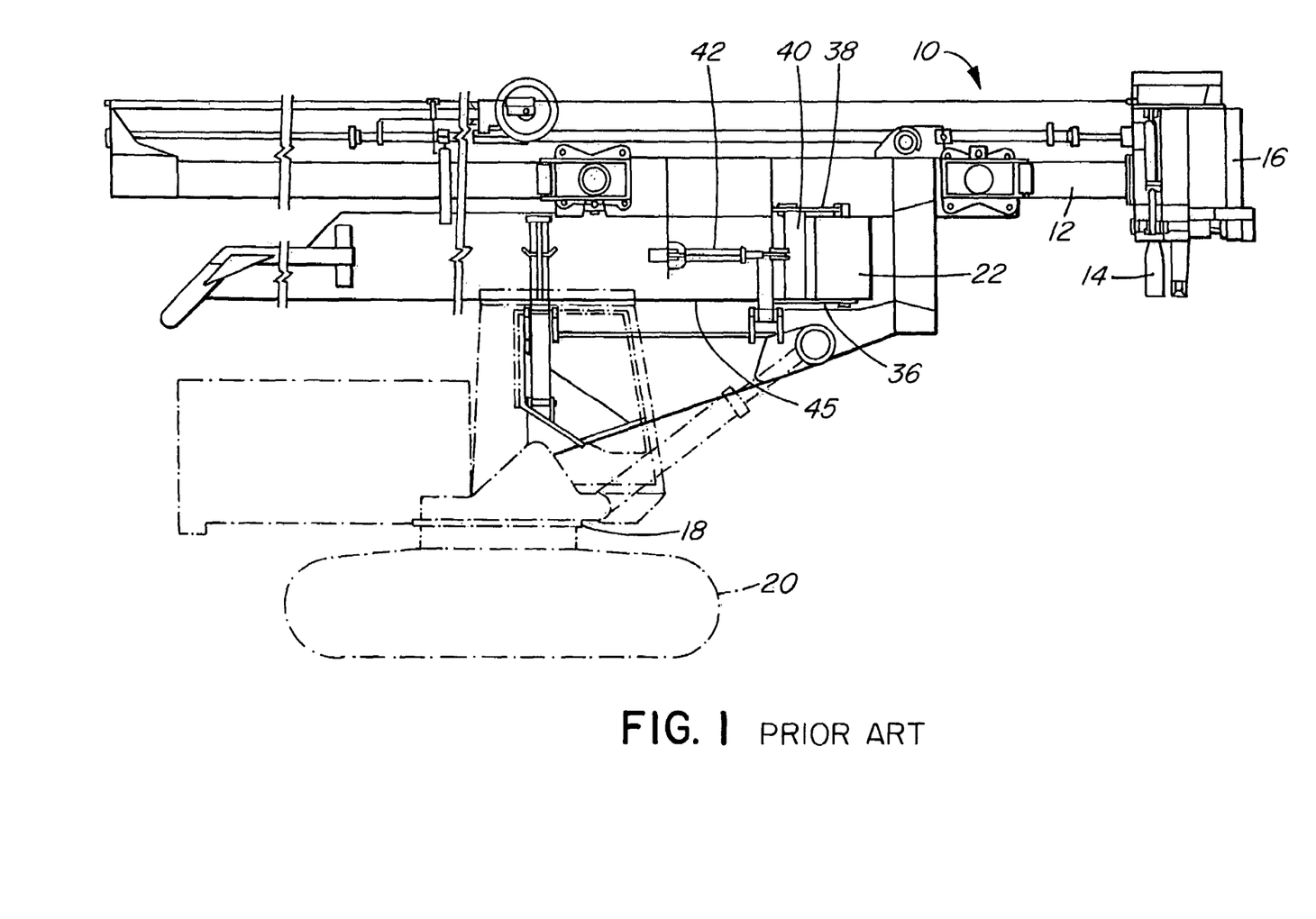
FIG. 1 is a side elevation of a prior art tree delimbing machine which includes a pair of feed rollers.

FIG. 1 illustrates a roll-stroke delimber 10 having a slidably displaceable boom 12 with a tree grapple 14 and saw 16 mounted at the free end of boom 12. Boom 12 is rotatably and pivotably supported above platform 18. Platform 18 is in turn mounted on a pair of treads 20 which may be driven in conventional fashion to propel delimber 10 relative to felled trees that are to be delimbed.

Roll-stroke delimber 10 may be actuated by its operator to tightly close grapple 14 about the butt of a felled tree and to retract boom 12 and, with it, the tree, toward log feed roller mechanism 22. Once grapple 14 is released, log feed roller mechanism 22 grips the tree and feeds it backwardly through tree guide tube 45. The tree is delimbed as its branches strike the arms of grapple 14 or cutters (not shown) mounted at the forward end of tube 45. Once the tree has been delimbed, log feed roller mechanism 22 may be actuated to propel the delimbed tree forwardly through tree guide tube 45. Saw 16 may then be actuated at selected intervals to buck the delimbed tree into desired lengths.

Figure 2:
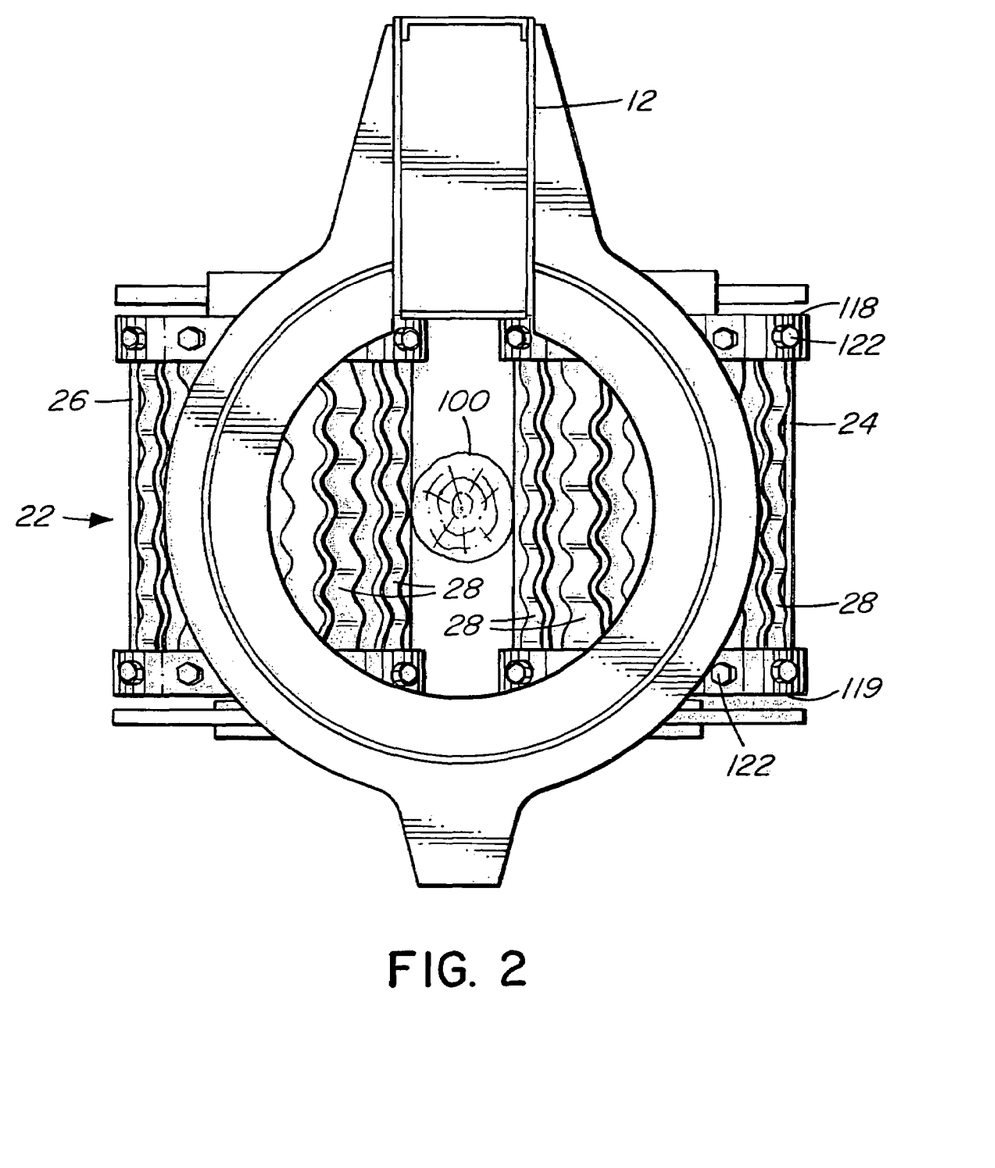
FIG. 2 is an enlarged end view of the feed roller portion of the machine of FIG. 1 equipped with feed rollers according to this invention.
Figure 3:
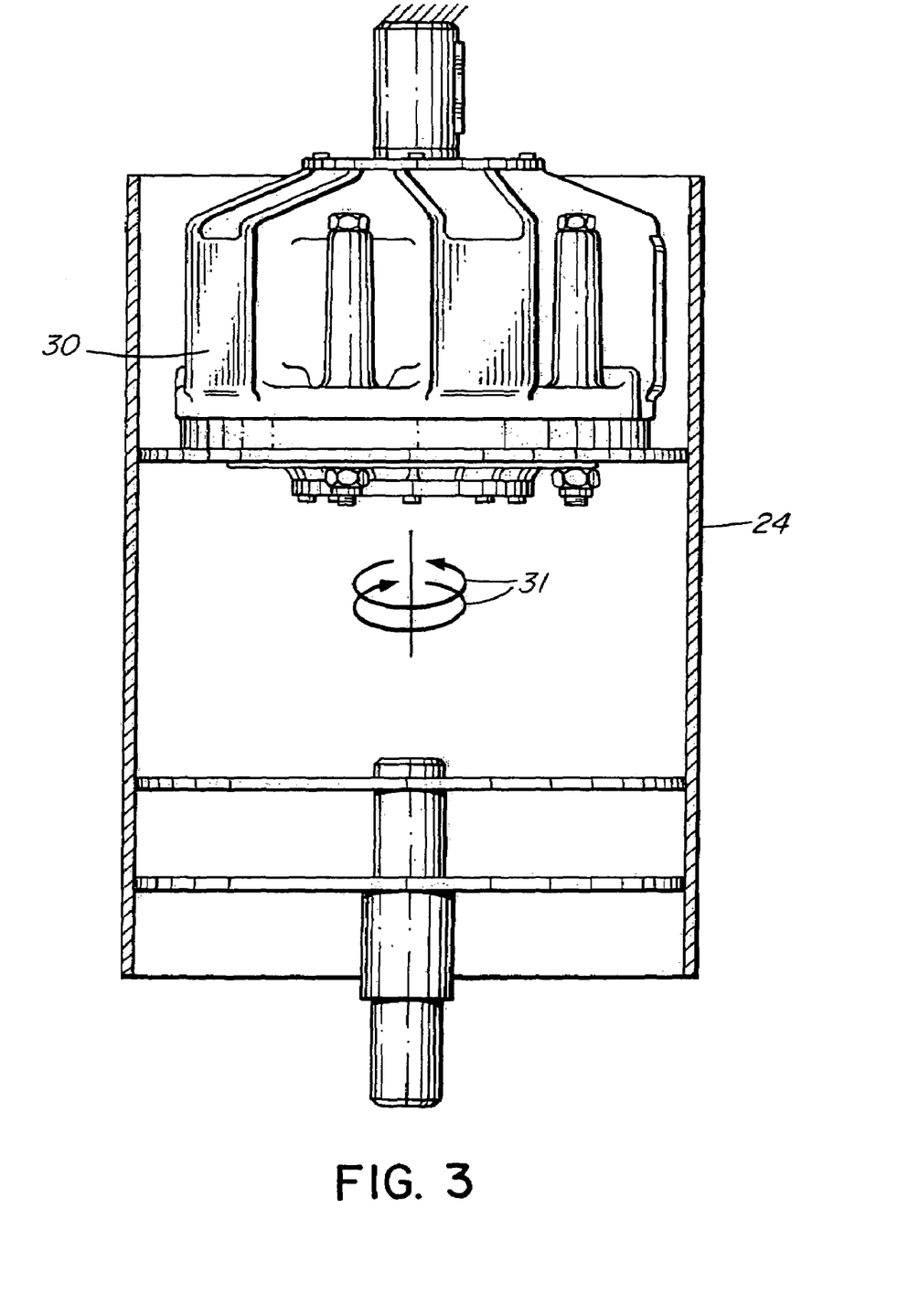
FIG. 3 is a cross-section through a feed roller.

Log feed roller mechanism 22 (FIG. 2) comprises a pair of feed rollers 24, 26 mounted parallel to one another (i.e. the longitudinal axes of rollers 24, 26 are parallel to one another and remain generally parallel to one another throughout the operation of delimber 10). A "drive means", such as a hydraulic motor 30 (FIG. 3) is connected to drivably counter-rotate rolls 24, 26 about their respective longitudinal axes. That is, motor 30 is capable of rotating roller 24 in either of the two directions illustrated by arrows 31 (FIG. 3). Similar provision is made for bidirectional rotation of roller 26. Other arrangements of driveshafts, motors, engines, etc. could be provided to turn one or both of feed rollers 24, 26. In the illustrated embodiment, a motor 30 is mounted inside each feed roller 24, 26.

Figure 4:
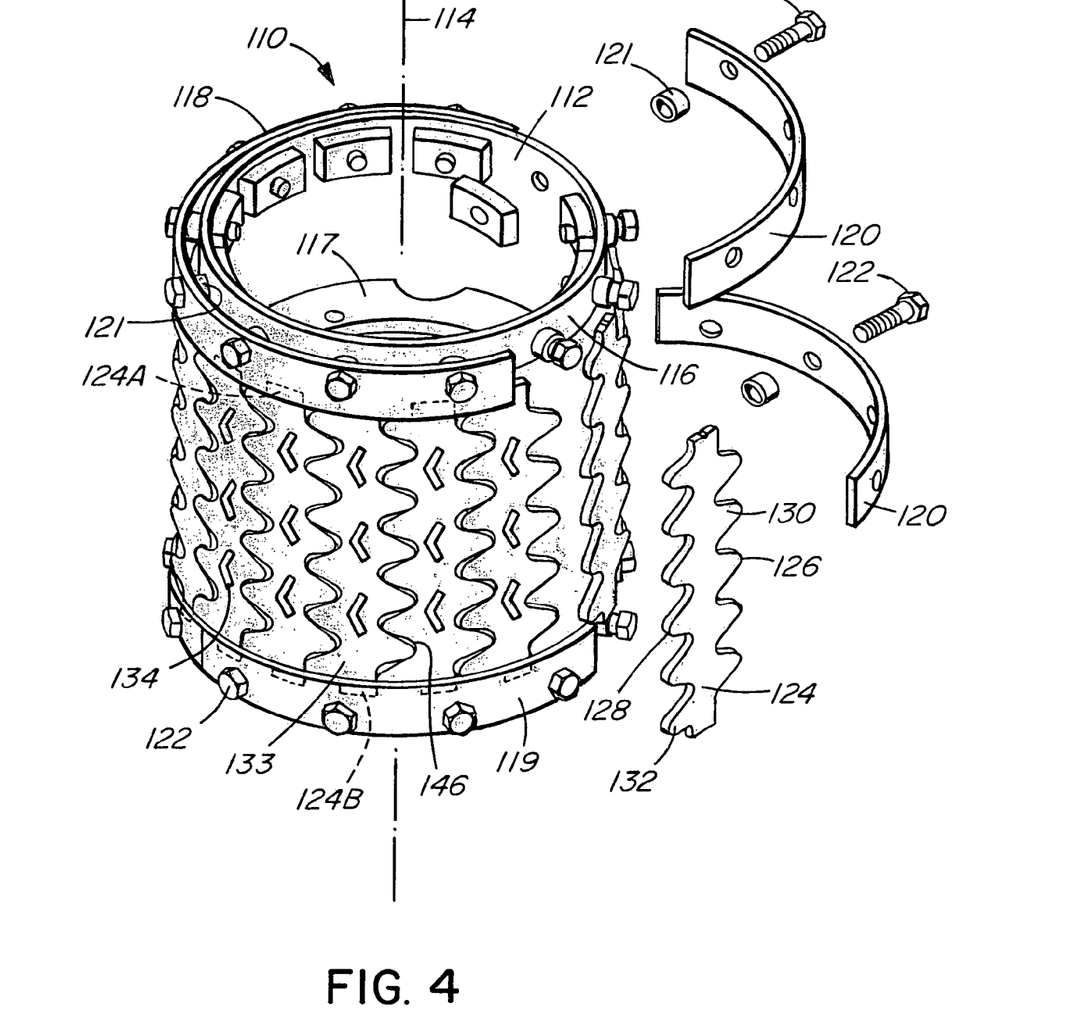
FIG. 4 is a perspective view of a feed roller according to one embodiment of the invention.

FIG. 4 shows a feed roller 110 according to one embodiment of this invention. Feed roller 110 comprises a cylindrical drum 112 having a longitudinal axis 114 and an outer surface 116. A flange 117 inside drum 112 permits drum 112 to be mounted for rotation on a tree handling machine such as, for example, a tree delimber. First and second rings 118 and 119 extend circumferentially around drum 112 at longitudinally spaced-apart locations. Each of rings 118 and 119 is spaced apart from outer surface 116 by spacers 121.

In the illustrated embodiment, rings 118 and 119 each comprise a plurality of arc-shaped sectors 120 which can be independently dismounted from drum 112. Sectors 120 are held in place by bolts 122 or other suitable fasteners.

A plurality of longitudinally extending strips 124 substantially cover the face of feed roller 110. Each strip 124 has a first end 124A engaged under first ring 118 and a second end 124B engaged under second ring 119. Strips 124 have leading edges 126 and trailing edges 128. Leading edges 126 are shaped to have a plurality of longitudinally spaced-apart projections 130. Each trailing edge 128 has a shape which is complementary to leading edge 126 of the adjacent strip 124. Projections 130 on leading edges 126 interdigitate with complementary projections 132 on trailing edges 128.

It can be seen that, in general, feed roller 110 comprises a rotatable support member to which are coupled a plurality of elongated strips 124. In the illustrated embodiment, the support member comprises drum 112. Strips 124 extend substantially parallel to one another and to an axis of rotation of drum 112. Strips 124 are arranged in a cylindrical configuration.

Figure 5:
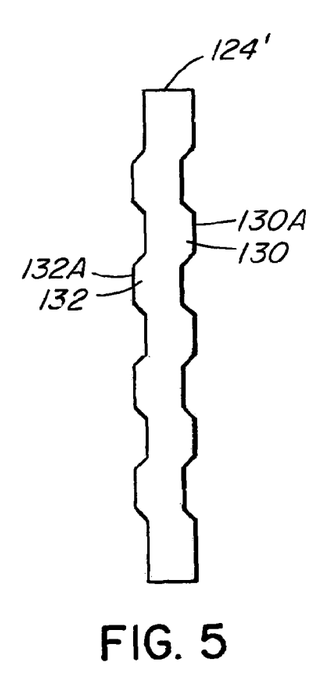
FIG. 5 illustrates a front elevation view of a strip according to an alternative embodiment of the invention.

In the illustrated embodiment, leading and trailing edges 126, 128 have wavy shapes such that projections 130 and 132 are rounded. Strips 124 may be called "contour-edged". FIG. 5 shows a strip 124' according to an alternative embodiment of the invention. Strip 124' has leading and trailing edges 126, 128, shaped to provide projections 130 and 132 that have flattened ends 130A, 132A.

Figure 10A:
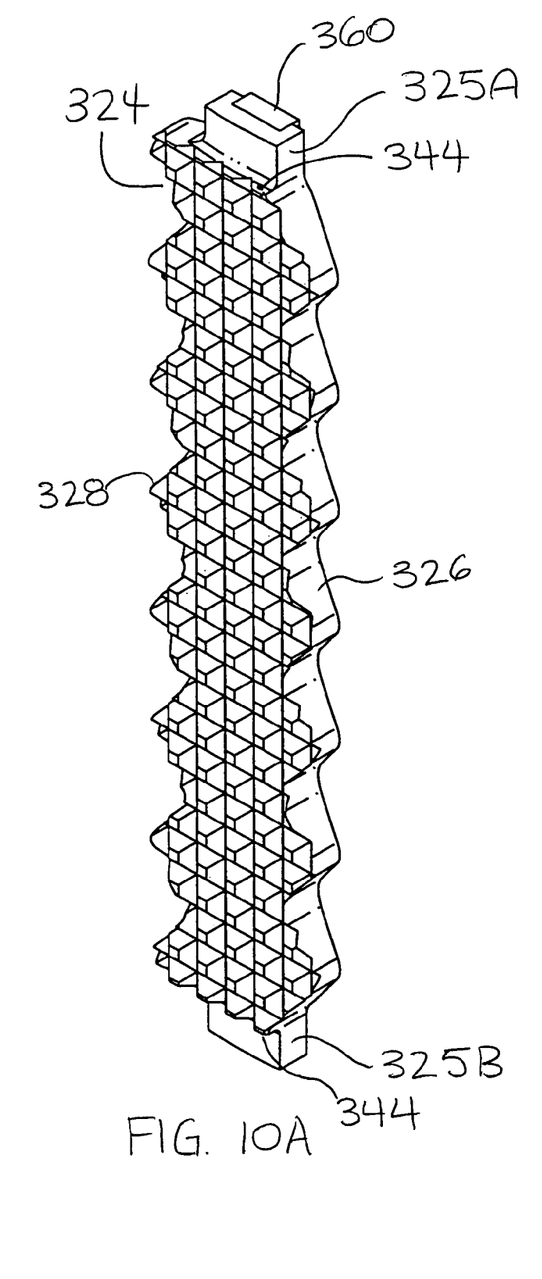
FIGS. 10A and 10B are respectively front and rear isometric views of one strip from the feed roller of FIG. 9; and, FIG. 11 is a schematic transverse cross section through one end of one of the strips of the feed roller of FIG. 9.
Figure 10B:
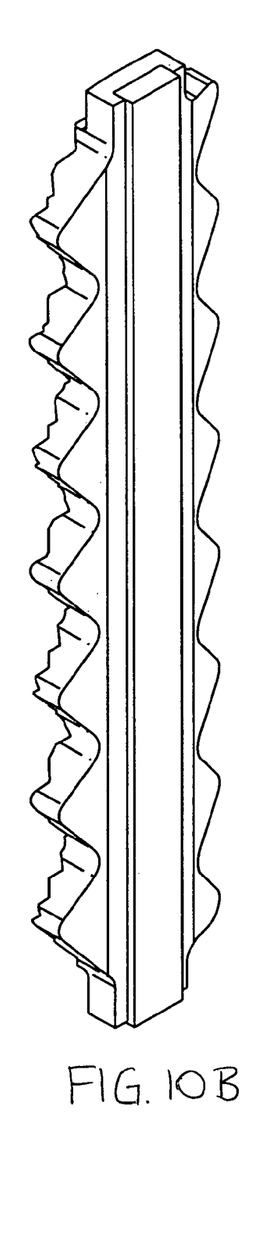

Outer faces 133 of strips 124 are textured to enhance frictional contact with a log. In the embodiment of FIG. 4, V-bars 134 are affixed to outer faces 133. In the embodiment of FIGS. 10A and 10B outer faces of the strips 24 are provided with a pattern of pyramidal projections.

Figure 6:
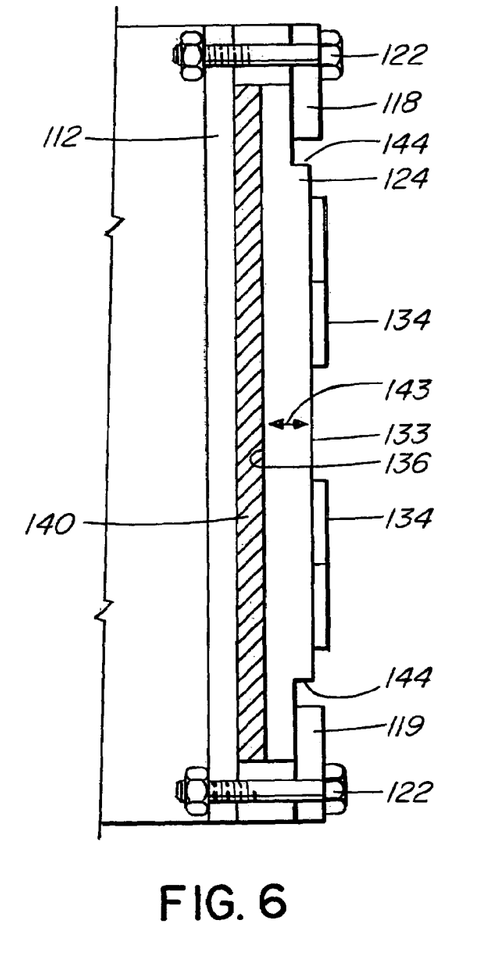
FIG. 6 is a transverse cross section through a portion of the feed roller of FIG. 4.

An inner face 136 (see FIG. 6) of each strip 124 is faced with a layer 140 of a resilient material. Layer 140 may, for example, comprise a layer of rubber, urethane or ceramic-impregnated urethane bonded to inner face 136. In some embodiments layer 140 is resilient. In such embodiments layer 140 may have a hardness of 80 or less on the Shore scale. In some embodiments, layer 140 has a hardness in the range of 25 to 45 on the Shore scale. In some embodiments, layer 140 has a harness in the range of 25 to 35 on the Shore scale. In some embodiments, layer 140 has a thickness in the range of about ½ inches to about 3 inches.

The construction of feed roller 110 permits strips 124 to rock slightly from side to side, as indicated by arrows 142 (FIG. 7), under the forces encountered when feed roller 110 bears against a log.

Strips 124 are preferably fabricated of a material which, if bent slightly, will spring back to its original shape. In one embodiment, strips 124 are fabricated from QT-100 steel (as defined by CSA standard 640.21/M). The resilience of strips 124 and the ability of layer 140 to yield under pressure permits strips 124 to flex inwardly and outwardly, as indicated by arrows 143 (FIG. 6), under the forces encountered when feed roller 110 bears against a log.

Strips 124 are captured by rings 118 and 119, but are free to float slightly. Longitudinal movement of strips 124 is limited by abutment surfaces on strips 124. In the illustrated embodiment of FIG. 6, the abutment surfaces comprise steps 144 on outer faces 133. Abutment surfaces could also be provided by other projections from strips 124, which can abut against part of the feed roller, such as rings 118 and 119, which are fixed to drum 112. Abutment surfaces could also be provided by surfaces of the drum. Circumferential motion of strips 124 is limited by adjacent strips 124. Strips 124 may each be free to float circumferentially relative to drum 112 until they contact an adjacent strip 124.

Strips 124 may be dimensioned so that, when strips 124 are equally spaced-apart around drum 112, leading edge 126 of each strip 124 is separated from the trailing edge 128 of an adjacent strip 124 by a narrow gap 146 (FIG. 4). During use, gaps 146 tend to become packed with wood fibres and other fine debris. This further locks strips 124 together and provides some cushioning between adjacent strips 124.

Figure 7:
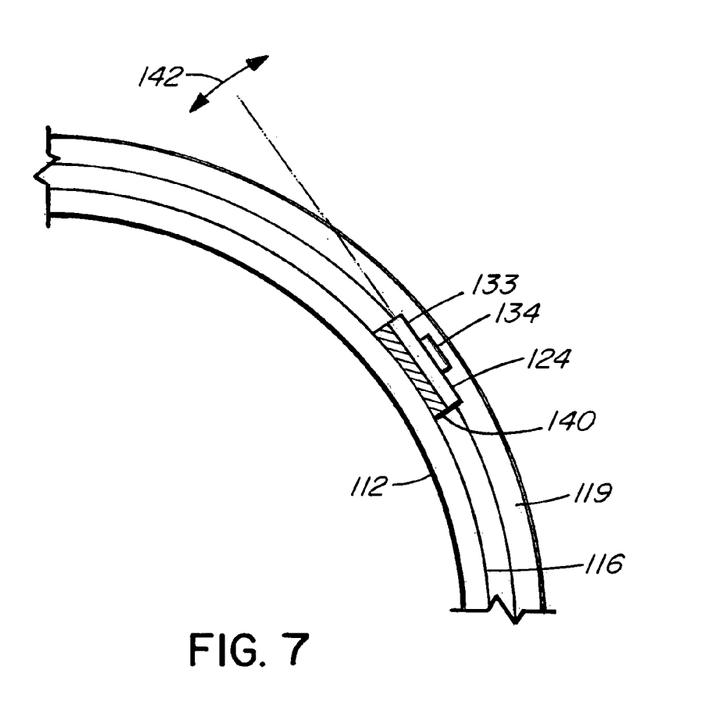
FIG. 7 is a longitudinal cross section through a portion of the feed roller of FIG. 4.
Figure 8:
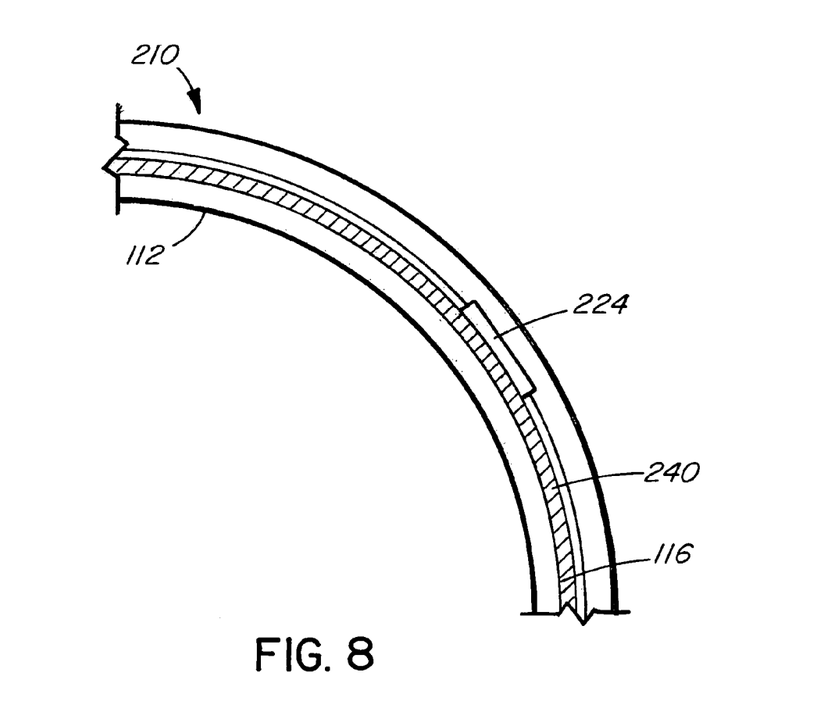
FIG. 8 is a transverse cross section through a portion of a feed roll according to an alternative embodiment of the invention.

FIG. 8 shows a section through a portion of a feed roller 210 according to an alternative embodiment of the invention. Feed roller 210 is similar to feed roller 110, except that a layer 240 of resilient material is affixed to surface 116 of drum 112. Strips 224 of the FIG. 8 embodiment may lack the layer 140 of resilient material of strips 124 of the FIG. 7 embodiment. Strips 224 are free to float slightly, as described above and can flex inwardly and outwardly and rock slightly under the forces exerted on them when feed roller 210 bears against a log. Layer 240 preferably has a hardness of 80 or less on the Shore scale. In some embodiments, layer 240 has a hardness in the range of 25 to 45 on the Shore scale. In some embodiments, layer 240 has a hardness in the range of 25 to 35 on the Shore scale.

Figure 9:
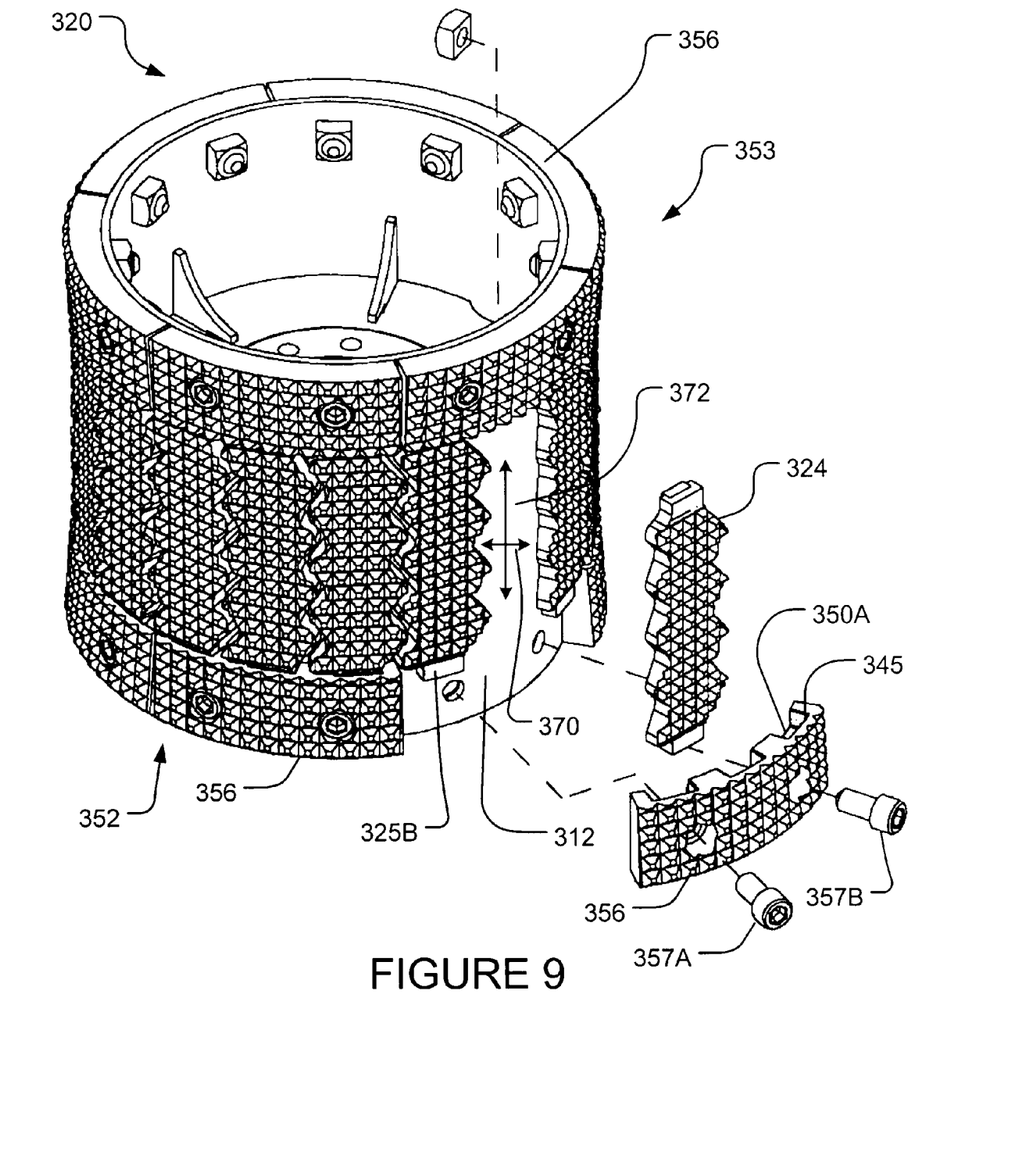
FIG. 9 is an isometric view of a feed roller according to a further alternative embodiment of the invention.

FIGS. 9, 10A and 10B show a feed roller 320 according to further alternative embodiment of the invention. Feed roller 324, comprises a cylindrical drum 312. Strips 324 are spaced apart around drum 312. Each strip 324 has a leading edge 326 and a trailing edge 328. Leading and trailing edges 326, 328 of adjacent strips 324 are respectively shaped to provide interdigitating projections 330 and 332.

Each strip 324 has end portions 325A and 325B. End portions 325A and 325B are received in pockets 350 in retaining members 352 and 353. In the illustrated embodiments, each retaining member 352, 353 comprises a plurality of removable segments 356. Each segment 356 has recesses 350A which provide pockets 350 when the segment is affixed to drum 310. A strip 324 may be removed for servicing or replacement by removing the segments 356 at one or both of its ends.

In the illustrated embodiment, segments 356 are held in place by fasteners, in particular bolts 357A and nuts 357B. Segments 356 may be affixed to drum 310 by other types of fastener or in any other suitable manner.

FIGS. 10A and 10B show a strip 324 in more detail. In this embodiment, each strip 324 has a band 360 of a resilient and/or slippery material extending along its inner-facing side. An outer-face of the illustrated strip 324 is textured. In the illustrated embodiment the texture is provided by an array of flattened pyramidal protrusions. Band 360 may, for example, comprise a suitable grade of nylon, urethane, Teflon™, or the like. Band 360 is preferably but not necessarily continuous. Band 360 may, for example, be made up of a row of pads affixed to a strip 324. In the illustrated embodiment, band 360 is retained in a longitudinal channel in the body of strip 324.

In some embodiments band 360 has a low static coefficient of friction with a material of the surface of drum 312. For example, in some embodiments the static coefficient of friction does not exceed 1. In some embodiments the static coefficient of friction between the material of drum 312 and the material of band 360 does not exceed $4 \times 10^{-1}$. Bands 360 are narrow enough and/or longitudinal edge portions of bands 360 are compressible enough to permit strips 324 to rock from side to side as shown in FIG. 7. If band 360 is made of a slippery material then rocking may involve a strip 324 rotating about a longitudinally-extending axis while the corresponding band 360 slides across the surface of drum 312 in a direction transverse to strip 324. If band 360 is made of a compressible material then rocking may involve one side of band 360 becoming compressed.

Figure 11:
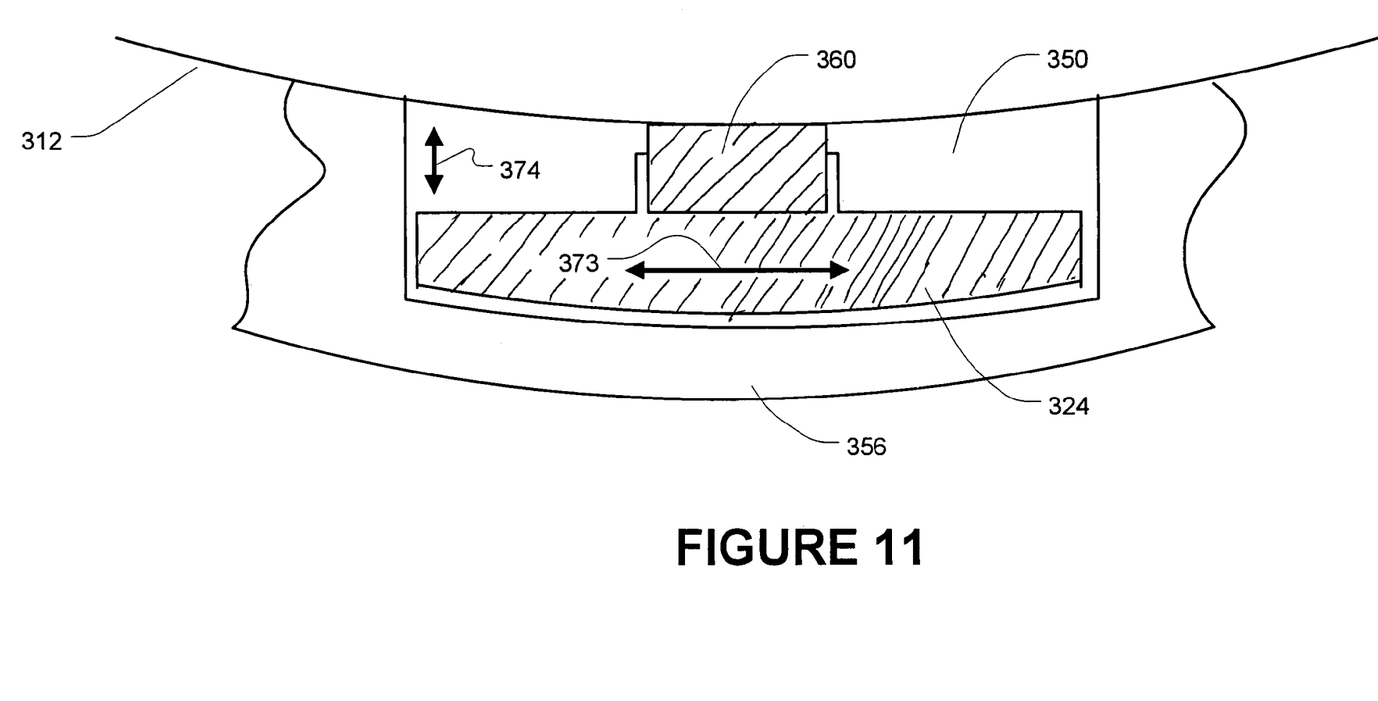

Pockets 350 provide a means for positively driving strips 324. Preferably as shown in FIG. 11, strips 324 fit somewhat loosely in pockets 350 so that strips 324 can slide transversely, as indicated by arrow 373. Pockets 350 also hold strips 324 loosely enough to permit strips 324 to rock as indicated by arrow 374.

In the illustrated embodiments, strips 324 have abutment surfaces 344 which, when the ends of strips 324 are engaged in pockets 350, can bear against corresponding surfaces 345 of segments 356. Preferably abutment surfaces 344 are spaced somewhat more closely than surfaces 345 so that strips 324 are not prevented from sliding slightly longitudinally relative to drum 312.

Retaining members 352 and/or 353 may have patterns of projections on their surfaces. Retaining members 352 and/or 353 optionally have faces which are angled inwardly toward strips 324. This may help to maintain logs in engagement with strips 324 in some cases.

Strips as described in relation to any of the above embodiments may be supplied as replacement parts for feed rollers according to the invention.

As will be apparent to those skilled in the art in the light of the foregoing disclosure, many alterations and modifications are possible in the practice of this invention without departing from the spirit or scope thereof. For example:

one of rings 118 and 119 or one of retaining members 352 and 353 could be non-removably mounted to drum 112;

one or both of rings 118 and 119 could be replaced with other attachment means which permit strips 124 or 224 to float slightly;

feed rolls according to the invention may be used in any context in which it is desired to feed a tree longitudinally;

In embodiments having pockets (for example pockets 350) the pockets could be formed, in part, by radial walls which are rigidly affixed to a drum.

Accordingly, the scope of the invention is to be construed in accordance with the substance defined by the following claims.

What is claimed is:

1. A feed roller for tree handling, the feed roller comprising:
    a drum having a longitudinal axis and a substantially cylindrical surface;
    a plurality of strips spaced apart around a circumference of the drum, the strips extending substantially parallel to the longitudinal axis, each strip having a leading edge and a trailing edge, each strip having projections on its leading and trailing edges, the projections on the leading edge of each strip interdigitating with projections on a trailing edge of an adjacent strip; and,
    each strip having a first end extending into a first pocket at a first end of the surface and a second end extending into a second pocket at a second end of the surface.

2. A feed roller according to claim 1 wherein each of the strips has an inward-facing portion, which bears against the drum, and an outward-facing portion and the inward facing portion is narrower than the outward facing portion.

3. The feed roll according to claim 1 wherein the surface comprises a layer of resilient material bonded to the drum.

4. A feed roll according to claim 1 wherein the leading and trailing edges of each strip have a wavy shape.

5. A feed roller according to claim 1 wherein the first pockets are defined at least in part by a retaining member comprising a plurality of circumferentially extending segments.

6. A feed roller according to claim 5 wherein each of the segments defines a plurality of the first pockets.

7. A feed roller according to claim 6 wherein each of the pockets comprises a leading abutment surface and a trailing abutment surface and the leading and trailing abutment surfaces are provided by surfaces of the segments.

8. A feed roller according to claim 1 wherein each of the pockets comprises a leading abutment surface and a trailing abutment surface and the leading and trailing abutment surfaces are provided by surfaces of the drum.

9. A feed roller according to claim 1 wherein outer surfaces of each of the strips comprise first and second abutment surfaces which limit longitudinal movement of the strips by abutting respectively against surfaces adjacent to the first and second pockets.

10. A feed roller according to claim 1 wherein outer faces of the strips comprise textured surfaces.

11. A feed roller comprising:
a drum having a longitudinal axis and a substantially cylindrical surface;
a plurality of strips spaced apart around a circumference of the drum, the strips extending substantially parallel to the longitudinal axis, each strip having a leading edge and a trailing edge, each strip having projections on its leading and trailing edges, the projections on the leading edge of each strip interdigitating with projections on a trailing edge of an adjacent strip; and,
each strip having a first end extending into a first pocket at a first end of the surface and a second end extending into a second pocket at a second end of the surface
wherein: each of the strips has an inward-facing portion, which bears against the drum, and an outward-facing portion; the inward facing portion is narrower than the outward facing portion; and the inward facing portion comprises a band of material mounted to the strip.

12. A feed roller according to claim 11 wherein the band of material comprises a resilient material.

13. A feed roller according to claim 11 wherein the band of material comprises a material having a low static coefficient of friction with the surface of the drum.

14. A feed roller according to claim 13 wherein the material has a static coefficient of friction with a material of the surface of the drum which does not exceed 1.

15. A feed roller according to claim 14 wherein the static coefficient of friction does not exceed $4 \times 10^-$.

16. A feed roller according to claim 11 wherein the band of material is retained in a longitudinal channel in the strip.

17. A feed roller according to claim 11 wherein the band of material comprises a nylon material.

18. A feed roll comprising:
a drum having a longitudinal axis and a substantially cylindrical surface;
a plurality of strips spaced apart around a circumference of the drum, the strips extending substantially parallel to the longitudinal axis, each strip having a leading edge and a trailing edge, each strip having projections on its leading and trailing edges, the projections on the leading edge of each strip interdigitating with projections on a trailing edge of an adjacent strip; and,
each strip having a first end extending into a first pocket at a first end of the surface and a second end extending into a second pocket at a second end of the surface
wherein the strips comprise steel strips.

19. A feed roll according to claim 18 wherein the strips comprise quenched tempered steel.

20. A feed roller for tree handling, the feed roller comprising:
a substantially cylindrical drum having a longitudinal axis;
a plurality of metal strips spaced apart around a circumference of the drum, the strips extending substantially parallel to the longitudinal axis, each metal strip having a leading edge and a trailing edge, the leading edge shaped to provide projections, and the trailing edge having a shape complimentary to the shape of the leading edge of an adjacent one of the strips, the projections on the leading edge of each metal strip interdigitating with projections on a trailing edge of an adjacent one of the metal strips;
wherein the strips are coupled to the drum by a coupling permitting the strips to rock from side to side.

21. A feed roller according to claim 20 wherein outer surfaces of each of the strips comprise abutment surfaces which limit longitudinal movement of the strips by abutting against parts fixed to the drum.

22. A feed roller according to claim 21 comprising a layer of resilient material between each of the metal strips and the drum.

23. A feed roller according to claim 22 wherein the resilient material has a hardness of less than 80 on the Shore scale.

24. A feed roller according to claim 20 comprising a layer of resilient material bonded to each of the strips.

25. A feed roller according to claim 20 comprising a layer of a slippery material mounted to each of the strips and bearing against a surface of the drum the slippery material having a static coefficient of friction with a material of the drum not exceeding 1.

26. A replacement tree gripping member for a feed roll for tree handling, the tree gripping member comprising:
a strip of metal having a textured outer face,
an inner face bearing a band of a material which is resilient, has a static coefficient of friction with steel not exceeding 1, or is both resilient and has a static coefficient of friction with steel not exceeding 1,
a wavy leading edge comprising a plurality of projections, and
a wavy trailing edge comprising a plurality of projections complementary to the leading edge projections wherein the band of material is narrower than the strip.

27. A replacement tree gripping member according to claim 26 wherein the outer face comprises abutment surfaces adjacent to each of first and second ends of the member.

28. A replacement tree gripping member according to claim 27 wherein the outer face is textured by a pattern of flattened pyramidal protrusions.

* * * * *

UNITED STATES PATENT AND TRADEMARK OFFICE
CERTIFICATE OF CORRECTION

PATENT NO. : 7,225,842 B2
APPLICATION NO. : 10/766081
DATED : June 5, 2007
INVENTOR(S) : Reggald Emory Isley

It is certified that error appears in the above-identified patent and that said Letters Patent is hereby corrected as shown below:

In the drawings, Sheet 1, Fig. 1, the reference numerals "36, 38, 40" and "42" should be deleted.
In the drawings, Sheet 2, Fig. 2, the reference numerals "28" and "100" should be deleted.
In the drawings, Sheet 7, Fig. 9, the reference numerals "370" and "372" should be deleted.
In the drawings, Sheet 8, Fig. 10A, the reference numeral 330 should be applied to the interdigitating projections along leading edge 326 of strip 324; reference numeral 332 should be applied to the interdigitating projections along trailing edge 326 of strip 324.

Column 4, line 14, "strips 24" is corrected to read --strips 324--.
Column 5, line 7, "roller 324" is corrected to read --roller 320--.
Column 5, lines 18 and 23, the two occurrences of "drum 310" are corrected to read --drum 312--.

Signed and Sealed this

Eighteenth Day of May, 2010

David J. Kappos
*Director of the United States Patent and Trademark Office*